(12) United States Patent
He et al.

(10) Patent No.: US 11,371,668 B2
(45) Date of Patent: Jun. 28, 2022

(54) SPARK SIMULATING DEVICE AND SIMULATED ELECTRIC FIREPLACE

(71) Applicant: JIANGMEN KEYE ELECTRIC APPLIANCES MANUFACTURING CO., LTD, Jiangmen (CN)

(72) Inventors: Xiangming He, Jiangmen (CN); Guanglian Lin, Jiangmen (CN)

(73) Assignee: JIANGMEN KEYE ELECTRIC APPLIANCES MANUFACTURING CO., LTD, Jiangmen (CN)

( * ) Notice: Subject to any disclaimer, the term of this patent is extended or adjusted under 35 U.S.C. 154(b) by 0 days.

(21) Appl. No.: 17/037,813

(22) Filed: Sep. 30, 2020

(65) Prior Publication Data

US 2021/0231274 A1 Jul. 29, 2021

(30) Foreign Application Priority Data

Jan. 23, 2020 (CN) .......................... 202010076481.X

(51) Int. Cl.
*F21S 10/04* (2006.01)
*F21V 23/00* (2015.01)
*F21V 8/00* (2006.01)

(52) U.S. Cl.
CPC .......... *F21S 10/043* (2013.01); *F21V 23/003* (2013.01); *G02B 6/0096* (2013.01)

(58) Field of Classification Search
CPC ..... F21S 10/043; F21V 23/003; G02B 6/0096
See application file for complete search history.

(56) References Cited

U.S. PATENT DOCUMENTS

| | | | |
|---|---|---|---|
| 7,236,693 B2 * | 6/2007 | Haugom | F24C 7/004 362/227 |
| 8,671,600 B2 * | 3/2014 | Lu | F21S 10/046 40/428 |
| 8,904,681 B2 * | 12/2014 | Pan | F24C 7/004 40/428 |
| 10,247,375 B1 * | 4/2019 | Lu | F21V 23/006 |
| 10,371,333 B2 * | 8/2019 | Jones | F24C 7/004 |
| 2002/0166554 A1 * | 11/2002 | Berg | F24B 1/1808 126/512 |
| 2005/0128751 A1 * | 6/2005 | Roberge | G06F 3/1446 362/276 |

(Continued)

FOREIGN PATENT DOCUMENTS

| | | |
|---|---|---|
| CN | 2618787 Y | 6/2004 |
| CN | 201680279 U | 12/2010 |

(Continued)

*Primary Examiner* — Bryon T Gyllstrom
(74) *Attorney, Agent, or Firm* — Schmeiser, Olsen & Watts, LLP

(57) ABSTRACT

Provided is an electric fireplace including a fireplace cabinet which is provided with a window, simulated fuel and an imaging plate disposed in the fireplace cabinet; the fireplace includes a spark simulating device, and the spark simulating device includes a light source and light pipes; the light-receiving ends of the light pipes are fixed oppositely to the light source to receive light from the light source, and light spots are formed at the light-emitting ends of the light pipes; the light-emitting ends of the light pipes are disposed on the simulated fuel and the imaging plate.

12 Claims, 5 Drawing Sheets

(56) References Cited

U.S. PATENT DOCUMENTS

| | | | | |
|---|---|---|---|---|
| 2009/0080871 A1* | 3/2009 | Chiu | ............... | F24C 7/004 392/348 |
| 2009/0313866 A1* | 12/2009 | Wang | ............... | F24C 7/004 40/428 |
| 2016/0195277 A1* | 7/2016 | Li | ............... | F24C 7/004 392/348 |
| 2018/0020524 A1* | 1/2018 | Tylicki | ............... | G02B 6/001 |
| 2021/0215311 A1* | 7/2021 | Hurduc | ............... | F21S 6/001 |

FOREIGN PATENT DOCUMENTS

| | | |
|---|---|---|
| CN | 202511185 U | 10/2012 |
| CN | 203036751 U | 7/2013 |
| CN | 203628512 U | 6/2014 |
| CN | 102980132 B | 8/2014 |
| CN | 205536076 U | 8/2016 |
| CN | 205536077 U | 8/2016 |
| CN | 205747107 U | 11/2016 |
| CN | 206037209 U | 3/2017 |
| CN | 206222233 U | 6/2017 |
| CN | 206545962 U | 10/2017 |
| CN | 207230707 U | 4/2018 |
| WO | 2014/139191 A1 | 9/2014 |

\* cited by examiner

SPARK SIMULATING DEVICE AND SIMULATED ELECTRIC FIREPLACE

CROSS-REFERENCE TO RELATED APPLICATIONS

This application claims priority to Chinese Application No. 202010076481.X, having a filing date of Jan. 23, 2020, the entire contents of which are hereby incorporated by reference.

FIELD OF TECHNOLOGY

The following relates to the technical field of simulated electric fireplaces, in particular to a spark simulating device which can simulate flickering sparks and a simulated electric fireplace installed with the spark simulating device.

BACKGROUND

As decorative equipment which integrates modern optical principles, the simulated electric fireplace has more outstanding decorative effects and is spread most widely. With electric energy as its energy source, the simulated electric fireplace is provided with no open flame, and two-dimensional or three-dimensional flames are generated relying on reflection of lights, then matched with simulated charcoal, a visual effect of simulating flame combustion is generated.

SUMMARY

An aspect relates to spark simulating devices and simulated electric fireplaces installed with any one of the above spark simulating devices.

In some embodiments, an electric fireplace includes a fireplace cabinet which is provided with a window, a simulated fuel and an imaging plate disposed in the fireplace cabinet, wherein it includes a spark simulating device, and the spark simulating device includes a light source and light pipes; the light-receiving ends of the light pipes are fixed oppositely to the light source to receive light from the light source, and light spots are formed at the light-emitting ends of the light pipes; the light-emitting ends of the light pipes are disposed on the simulated fuel and the imaging plate.

In some embodiments, the light source includes a number of independent sub-light sources, and the light-receiving ends of each light pipes are fixed oppositely to one sub-light source; or the light-receiving ends of a number of light pipes are all fixed oppositely to one sub-light source.

In some embodiments, a spark flicker controller is also included, and the spark flicker controller controls a number of sub-light sources to be turned on or off.

In some embodiments, each light pipe is a translucent or transparent light pipe.

In some embodiments, a part of each light pipe penetrates through and is exposed on the simulated fuel and the imaging plate.

In some embodiments, each light pipe is a flexible light pipe.

In some embodiments, a spark simulating device includes a light source and light pipes. One end of each light pipe is fixed oppositely to the light source to receive light from the light source, and a light spot is formed at the other end of each light pipe.

BRIEF DESCRIPTION

Some of the embodiments will be described in detail, with reference to the following figures, wherein like designations denote like members, wherein FIG. 1 is a structural sketch view of part of the electric fireplace in some embodiments;

Figure 1:
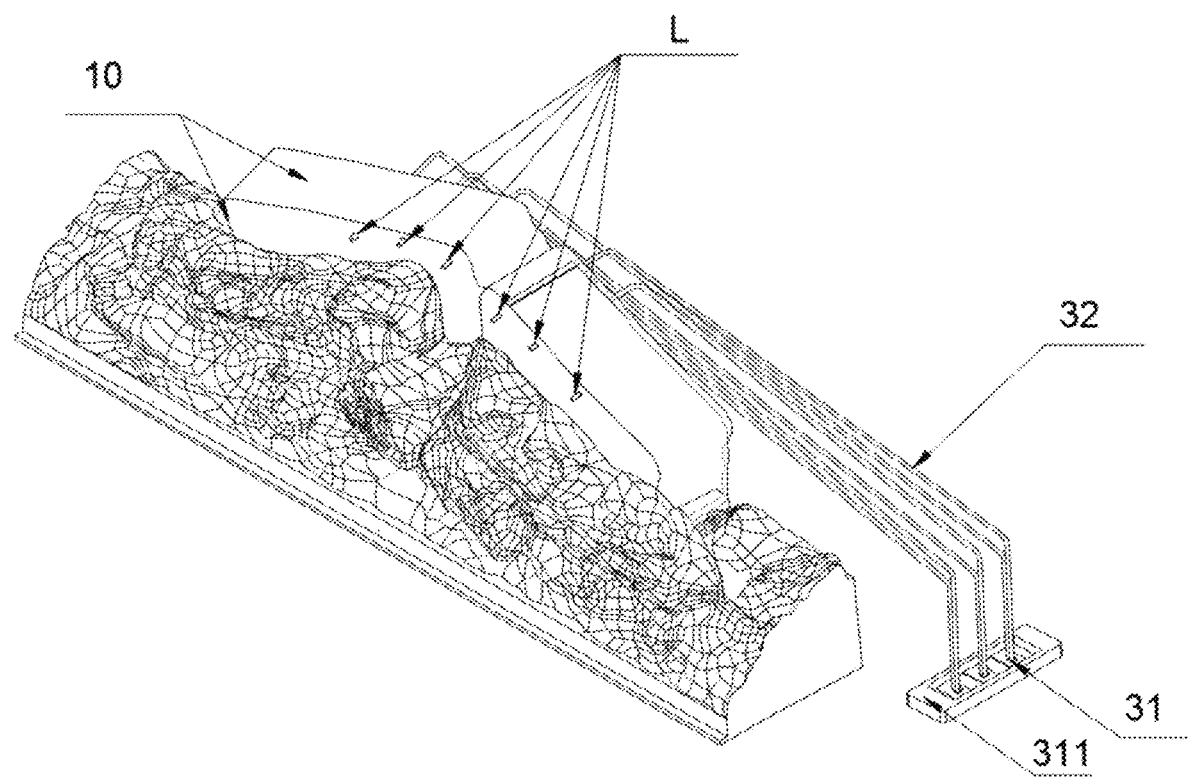

Reference numerals in the figures:
10—simulated fuel, 20—imaging plate, 31—light source, 32—light pipe, 311—circuit board, 41—light emitter, 42—light-transmitter, 421—connecting component, 422—light-mixing block, 43—support frame, 44—motor, L—light spot.

DETAIL DESCRIPTION

For a better understanding and implementation, embodiments of the present invention will be described in detail below in combination with accompanying drawings.

Figure 2:
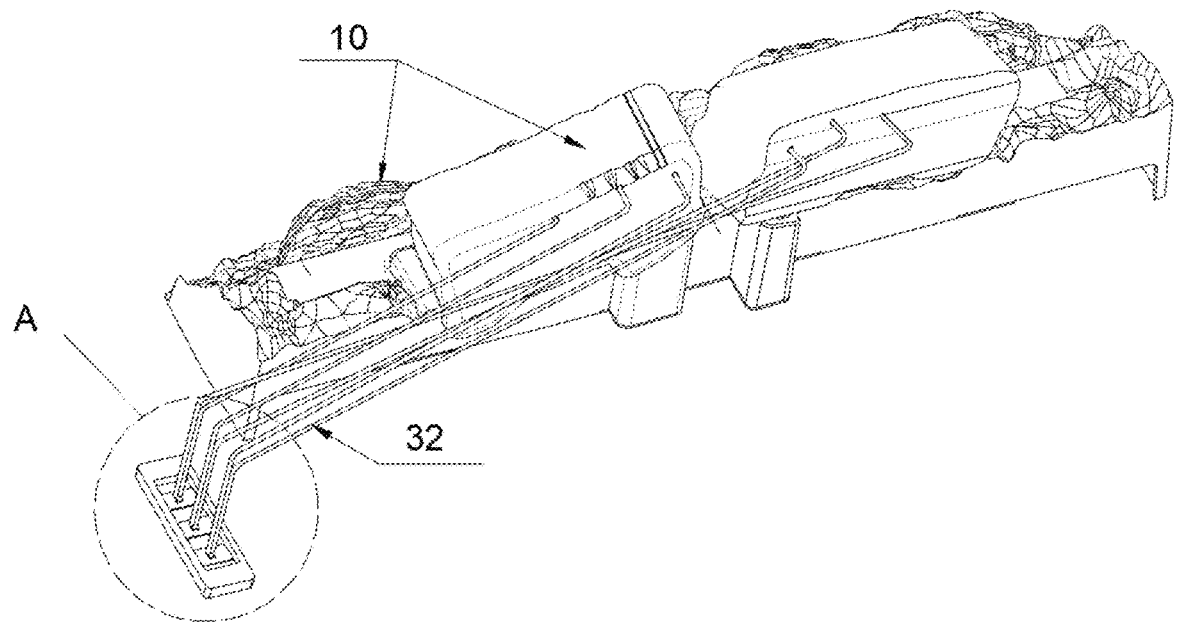
FIG. 2 is an installation diagram of the spark simulating device in some embodiments.
Figure 3:
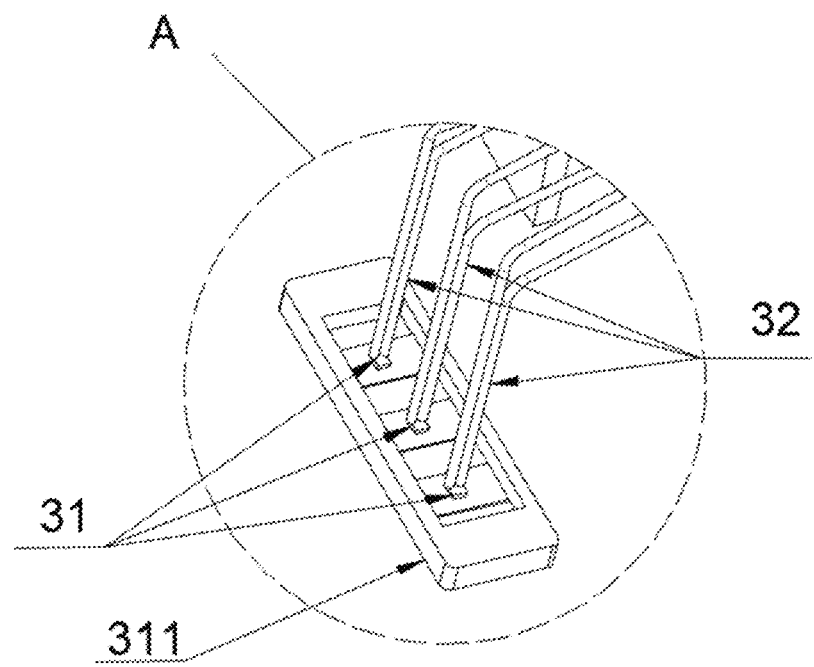
FIG. 3 is a partial enlarged view of FIG. 2.

Please refer to FIGS. 1-3, in some embodiments, an electric fireplace includes a fireplace cabinet (not shown), simulated fuel 10, and a spark simulating device provided in the fireplace cabinet; a window (not shown) is provided in the front side of the fireplace cabinet which is connected with the inner cavity of the fireplace cabinet, and the spark simulating device is provided in the inner cavity of the fireplace cabinet.

The simulated fuel 10 is disposed near the window, and the simulated fuel 10 can be seen when looking from the window to the inner cavity of the fireplace cabinet. In some embodiments, the simulated fuel 10 includes simulated embers and simulated charcoal. In some embodiments, a plurality of simulated charcoal stacked on the simulated embers pile, and the plurality simulated charcoal inclined toward the inner cavity; the simulated charcoal is made of light-transmitting resin and is grayish black. In some embodiments, a simulated fuel light source (not shown) for illuminating the simulated fuel 10 is disposed below the simulated fuel 10. In some embodiments, the simulated fuel light source is an LED lamp, and the LED lamp is orange-red or orange-yellow.

The spark simulating device includes a light source 31 and light pipes 32. The light-receiving ends of one or more light pipes 32 are fixed oppositely to the light source 31 to receive light from the light source 31 and form light spots L at the light-emitting ends of the light pipes; the light-emitting ends of the light pipes 32 are disposed on the simulated fuel 10 to produce the effect of simulated sparks.

The light pipes 32 used to transmit light generated by the light source 31 are hollow pipes. In some embodiments, the light pipes 32 are rigid or flexible. In some embodiments, each of the light pipes 32 is made of a flexible material, and each flexible light pipe 32 is more convenient to install and fix which is more maneuverable. In some embodiments, each light pipe 32 is opaque, transparent or translucent. In some embodiments, each light pipe 32 is a fiber made of glass or plastic.

In some embodiments, the light source 31 includes multiple sub-light sources. In some embodiments, the sub-light sources are LED light sources, and the LED light sources are orange-red or orange-yellow. Each sub-light source is an LED light-emitting chip, and the LED light-emitting chip is disposed on a circuit board 311. The LED light-emitting chips are arranged on the circuit board 311 at equal intervals, and then the circuit board 311 with the light source 31 can be fixed at any position in the inner cavity of the fireplace cabinet. The circuit board 311 is fixed on a bottom plate (not shown) of the fireplace cabinet. In some embodiments, a plurality of sub-light sources are controlled by a spark flicker controller. In some embodiments, the spark flicker controller is a chip, which can control a single sub-light source intermittently on and off through a preset flicker frequency and duration, or control multiple sub-light sources to twinkle orderly or disorderly by a preset flicker frequency and duration. For different effects, in some embodiments, the light-receiving end of each single light pipe 32 is fixed oppositely to a single sub-light source; in some embodiments, when the diameter or size of each light pipe 32 is smaller than the luminous area of the sub-light source, the light-receiving ends of some light pipes 32 are fixed oppositely to one sub-light source to achieve a variety of different spark color distribution and twinkling effects.

In some embodiments, multiple light pipes 32 are fixed to one sub-light source. There are many ways to fix the light pipes, in some embodiments, each light pipe 32 is fixed to the sub-light source in the way that the opening of its light-receiving end is aligned and glued to the light source 31. The light-emitting end of each light pipe 32 is fixed on the simulated fuel 10. There are many ways to fix the light pipes on the simulated fuel, in some embodiments, a number of holes are drilled in the simulated fuel 10, and then the ends of the light pipes 32 penetrate through the holes and are fixed via gluing. Hence a user can guide multiple light pipes 32 to different positions on the front side of the simulated fuel 10 depending on the design requirements, forming several light spots L on the front side to simulate the effects of multiple sparks twinkling.

In some embodiments, a part of each light pipe 32 is exposed on the simulated fuel 10. Because each light pipe 32 is translucent or transparent, during its light transmitting process, in addition to its light-emitting end which will produce concentrated and bright light, light can also be seen in its exposed part; when the light source 31 is powered on, the light transmission track along each light pipe 32 is showed to resemble the track of spark floating in its body, and a spark is simulated at its light-emitting end. Hence the track of spark irregular floating and the effect of spark twinkling are simulated concurrently.

When in use, the light source emits light after being powered on, and under the control of the spark flicker controller, the single light source blinks at a certain frequency, and the multiple light sources blink orderly or disorderly; the light generated by the light source transmits in the light pipes to form concentrated and bright light at the light-emitting ends of the light pipes, and then a number of flickering small light spots are formed at the preset positions on the front side of the simulated fuel, thereby simulating the effect of sparks twinkling. While for the part of each light pipe exposed to the simulated fuel, during the flickering of the light source, due to the existence of visual residue, the visual perception is the trace of light passing through the body part of each light pipe, thus simulating the effect of spark floating.

In some embodiments, the electric fireplace includes a fireplace cabinet (not shown) and a simulated fuel 10, a spark simulating device, a flame simulating device, and an imaging plate 20 provided in the fireplace cabinet.

Figure 4:
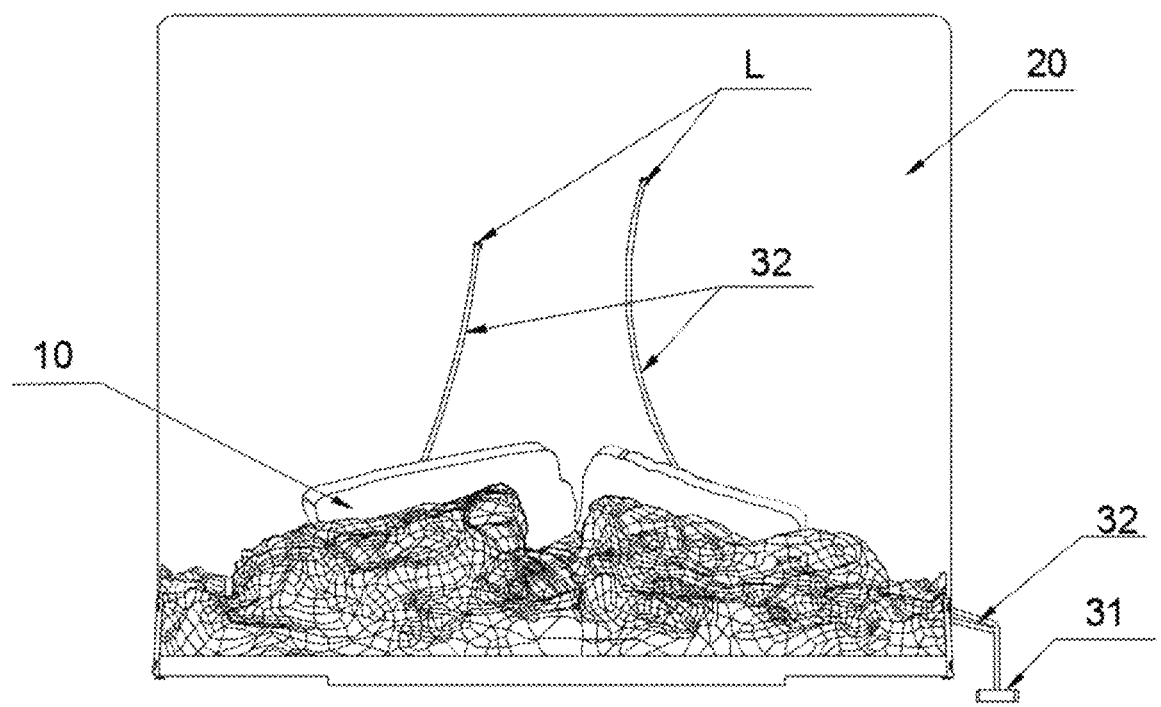
FIG. 4 is a front view of part of the structure of the electric fireplace in some embodiments.
Figure 5:
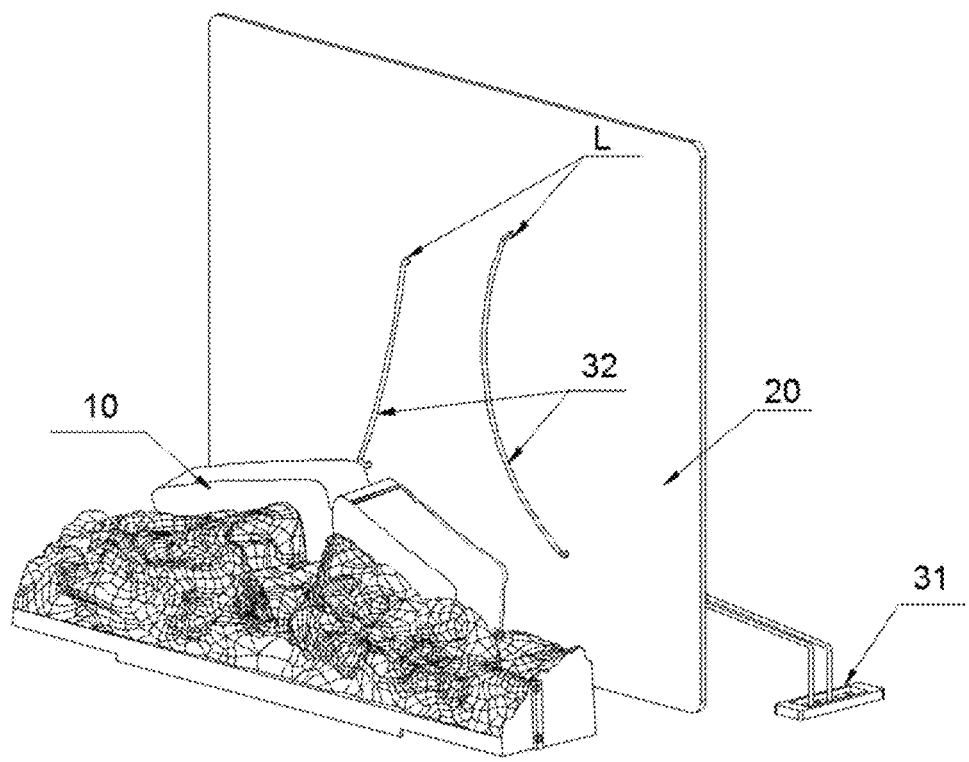
FIG. 5 is a side view of part of the structure of the electric fireplace in some embodiments.
Figure 6:
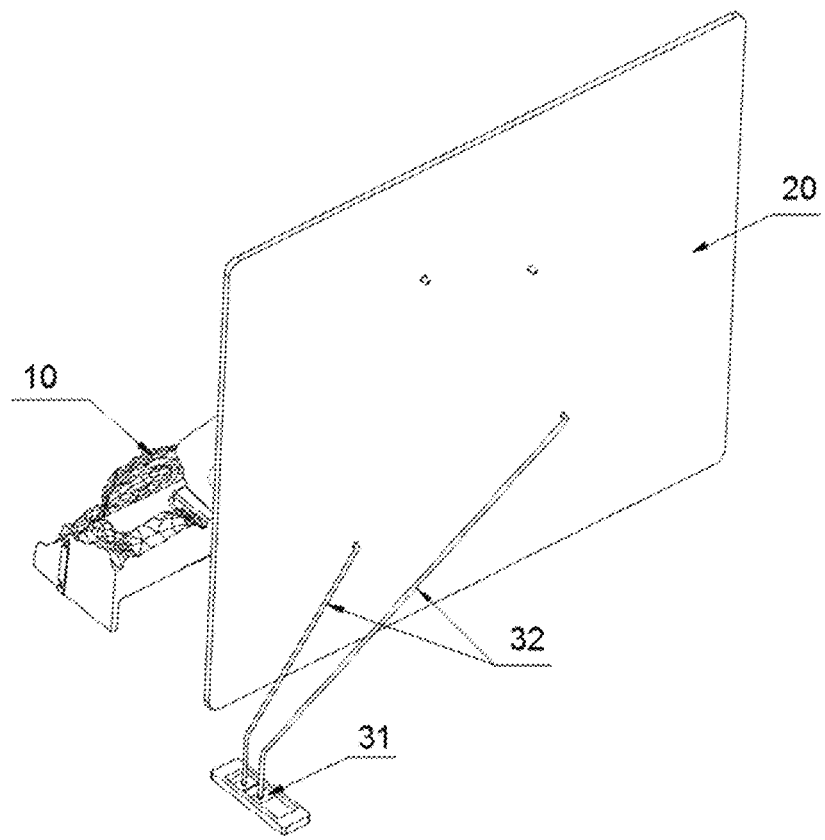
FIG. 6 is a rear view of part of the structure of the electric fireplace in some embodiments.

The simulated fuel 10 and the spark simulating device are generally the same as those in above embodiments. please refer to FIGS. 4-6, the only difference is that the light-emitting ends of the light pipes 32 of the spark simulating device are disposed on the simulated fuel 10 and the imaging plate 20, which can simulate the effect of spark flashing on the simulated fuel 10 and the imaging plate 20 respectively or simultaneously. In some embodiments, the electric fireplace also includes a flame simulating device. The flame simulating device uses light to simulate and project the effect of flames flickering onto the imaging plate. And the spark simulating device resembles spark flickering so that the three-dimensional and lifelike effect of the electric fireplace are further improved.

Figure 7:
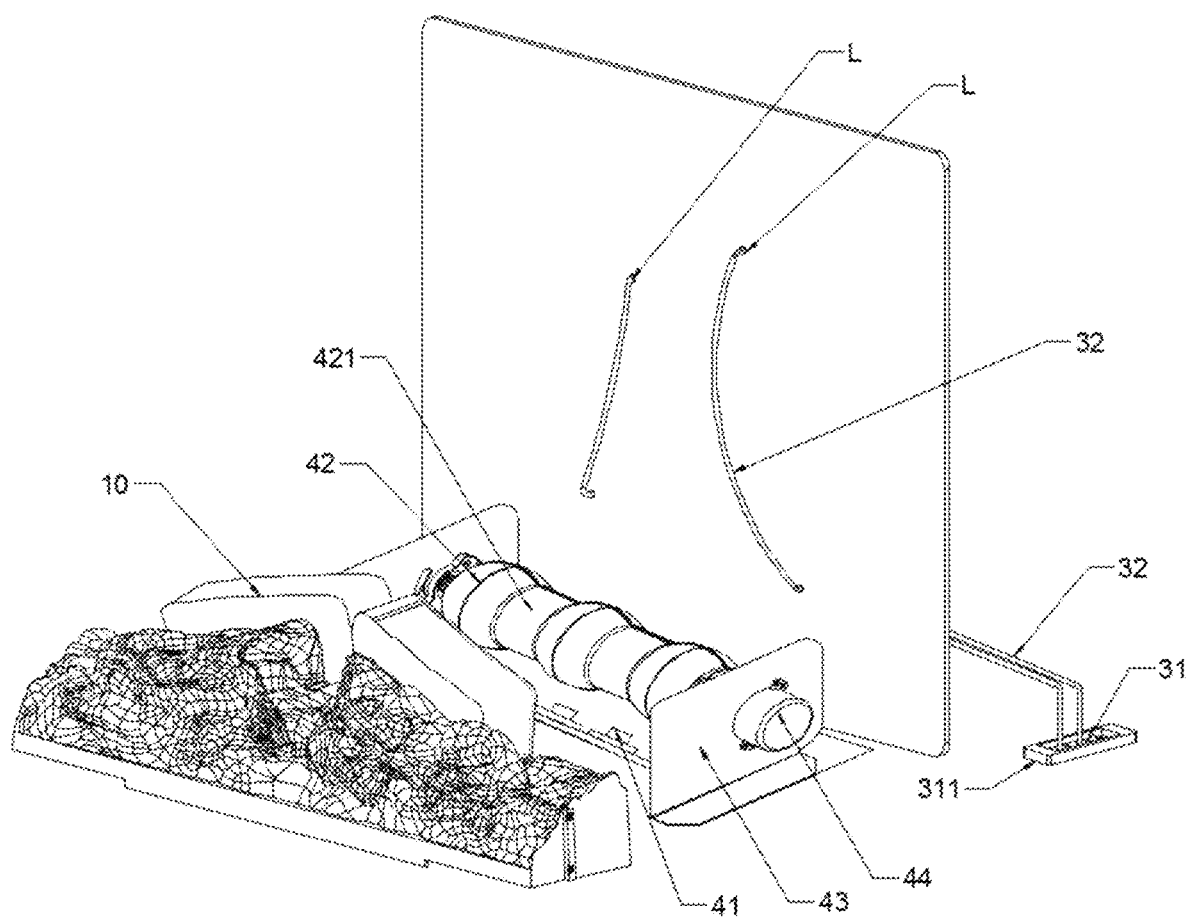
FIG. 7 is an installation position diagram of the light-transmitter in some embodiments.

Referring to FIG. 7, in some embodiments, the flame simulating device includes a light emitter 41 and at least one rotatable light-transmitter 42. The light emitter 41 emits a first light group, then the first light group is projected into the light-transmitter 42 to form a second light group, and the second light group is projected onto the imaging plate 20 to form an image.

In some embodiments, the light emitter 41 includes at least one row of LED arrays arranged at equal intervals by a number of LED chips. The LED arrays are arranged parallel to the axial direction of the light-transmitter 42 and are opposite to the light-transmitter 42. Each of the LED arrays includes at least a blue LED chip and an orange-red LED chip.

Figure 8:
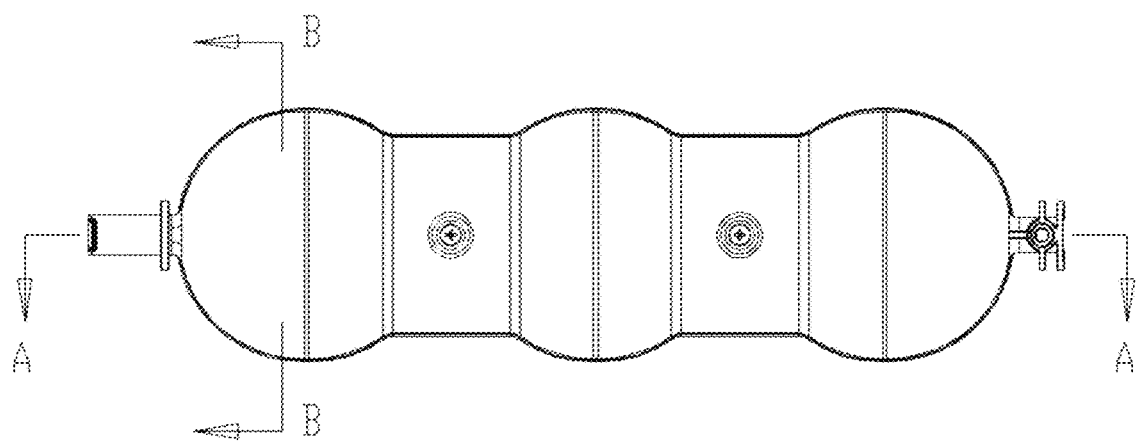
FIG. 8 is an overall structural view of the light-transmitter in some embodiments.
Figure 9:
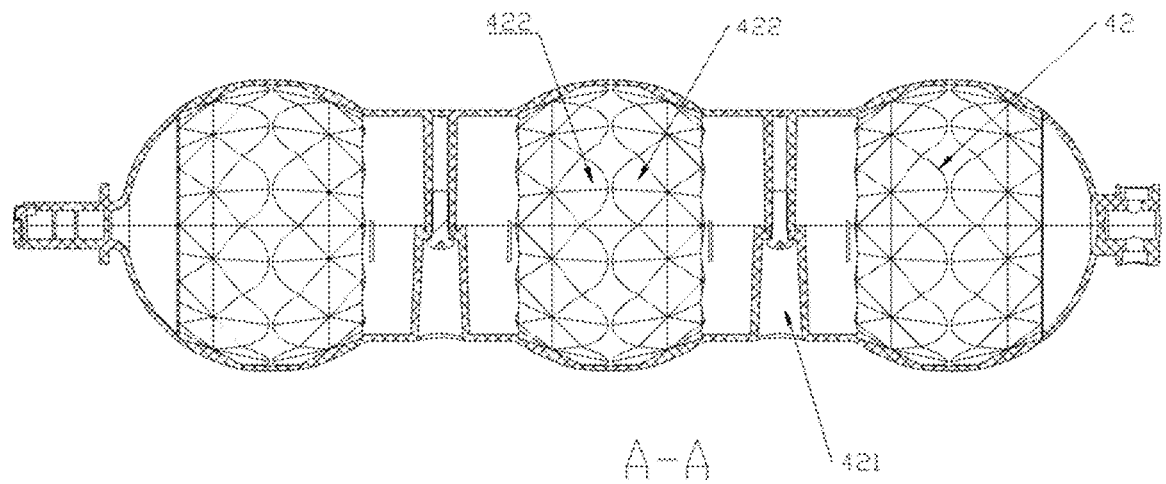
FIG. 9 is an A-A sectional view of the light-transmitter of FIG. 8.
Figure 10:
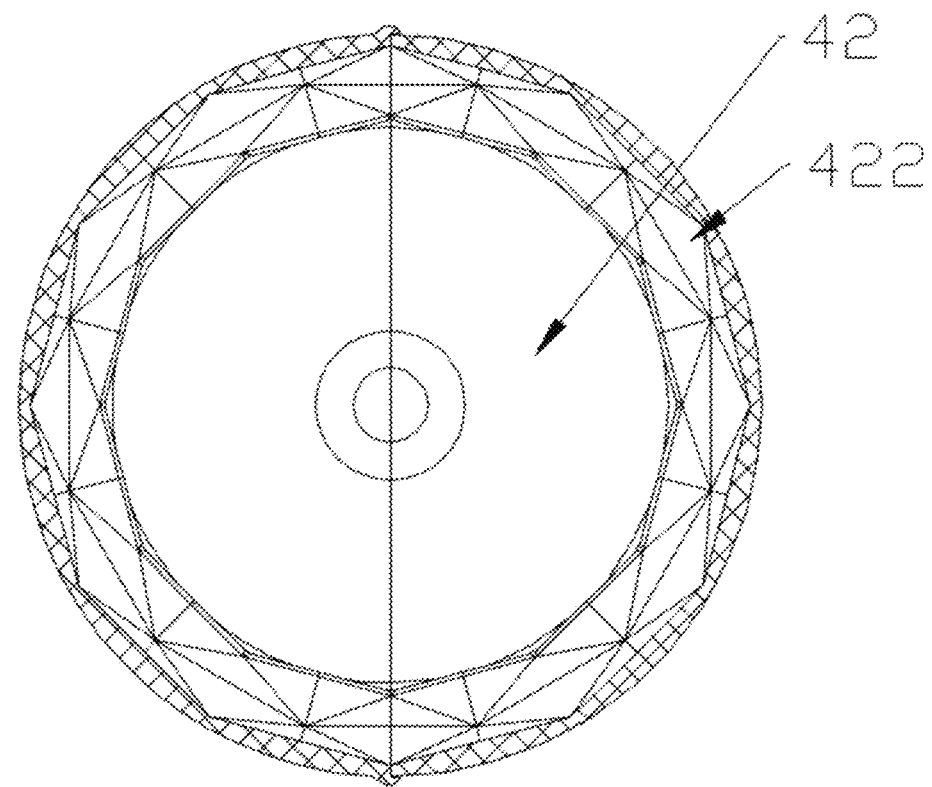
FIG. 10 is a B-B sectional view of the light-transmitter of FIG. 8.

In some embodiments, each of the light-transmitters 42 is a symmetrical structure or an asymmetric structure; in some embodiments, each of the light-transmitter 42 is a solid structure or a hollow structure. Referring to FIGS. 8-10, in some embodiments, the light-transmitter 42 is a sphere, a cylinder, or a rotary body formed by taking an arched arc as a generatrix and taking a line at both ends of the arc or a line parallel to the line as an axis. Each of the light-transmitter 42 is provided with a number of light-mixing blocks 422. The light-mixing blocks 422 are convex lenses or concave lenses, or a combination of both. The light-mixing blocks 422 are closely arranged along the circumferential direction of the light-transmitter 42 to form a light-mixing block circle, and a number of light-mixing block circles are arranged along an axial direction of the light-transmitter 42. The light emitted by the light emitter 41 creates a mixing effect of reflection, refraction, concentration, and astigmatism between these convex lenses, concave lenses, or a combination thereof. In some embodiments, when each of the light-transmitters 42 is hollow, the light-mixing block 422 is disposed on its outer wall and an inner wall. In some embodiments, when each of the light-transmitters 42 is solid, the light-mixing block 422 is disposed on its outer surface.

In some embodiments, at least two light-transmitters 42 are coaxially arranged and connected through a connecting component 421; the connecting component 421 may be transparent or opaque. In some embodiments, the connecting component 421 is a cylinder with a diameter slightly smaller than the hollow sphere, and the surface of the connecting component is provided with a frosted surface to form an opaque structure to reduce the mutual interference between the light passing through each light-transmitter 42. In some embodiments, three light-transmitters 42 are provided, and the three light-transmitters 42 and the two connecting components 421 are integrally formed, which are mounted on the bottom plate (not shown) of the fireplace cabinet through a support frame 43. In some embodiments, the rotary axle shaft of the light-transmitters is hinged and threaded on the support frame 43, and the light-transmitters are driven to rotate by a motor 44.

In some embodiments, the imaging plate 20 is a rear shell plate of the fireplace cabinet, and a wallpaper with a brick pattern is pasted thereon. In some embodiments, the imaging plate 20 is a transparent plate disposed in the middle of the fireplace cabinet. In some embodiments, the imaging plate 20 is a translucent plate made from hard transparent plastic with optical properties.

When in use, the first light group emitted by the light emitter after powered on projected into the rotary light-transmitters, it passes through the light-transmitter and the light-mixing block provided on the light-transmitters to generate multiple times of reflection, refraction, concentration and astigmatism, and then a second light group is formed and projected onto the imaging plate to achieve light spots of different brightness and darkness. As the surface of each of the light-transmitters with an arc structure, and the position of each light-mixing block on the light-transmitter is different, and the distance from the light-mixing block to the imaging plate is also different, so after light passes through different light-mixing blocks, the size, shape, brightness, and positions of the light spots formed on the imaging plate are different, and with the rotating of the light-transmitters, the mixed light on the imaging plate will show the effects of the flickering flames and the jumping flames. The spark simulating device forms light spots L on the simulated fuel and the imaging board, and a plurality of sub-light sources on and off in an orderly or disorderly manner under the control of a spark flicker controller. While for the part of each light pipe exposed to the simulated fuel and the imaging board, during the flickering of the light source, due to the existence of visual residue, the visual perception is the trace of light passing through the exposed part of each light pipe, thus simulating the effect of spark floating.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality.

What is claimed:

1. An electric fireplace, comprising:
a fireplace cabinet which is provided with a window;
a simulated fuel disposed in the fireplace cabinet; and
an imaging plate disposed in the fireplace cabinet; and
a spark simulating device including a light source and light pipes, wherein light-receiving ends of the light pipes are fixed oppositely to the light source to receive light from the light source, and light spots are formed at the light-emitting ends of the light pipes, the light-emitting ends of the light pipes are disposed on the simulated fuel and the imaging plate.

2. The electric fireplace of claim 1, wherein the electric fireplace further comprises a flame simulating device and the flame simulating device generates light and projects onto the imaging plate to simulate flames.

3. The electric fireplace of claim 2, wherein the light source comprises a number of independent sub-light sources, and the light-receiving end of each light pipe is fixed oppositely to one sub-light source.

4. The electric fireplace of claim 2, wherein the light source comprises a number of independent sub-light sources, and the light-receiving ends of a number of light pipes are fixed oppositely to one sub-light source.

5. The electric fireplace of claim 3, wherein the electric fireplace further comprises a spark flicker controller and the spark flicker controller controls a number of sub-light sources to be turned on or off.

6. The electric fireplace of claim 5, wherein each of the light pipes is selected from a group consisting of a translucent light pipe and a transparent light pipe.

7. The electric fireplace of claim 6, wherein a part of each light pipe penetrates through and is exposed on the simulated fuel and the imaging plate.

8. The electric fireplace of claim 7, wherein the light pipes are flexible light pipes.

9. The electric fireplace of claim 4, wherein the electric fireplace further comprises a spark flicker controller and the spark flicker controller controls a number of sub-light sources to be turned on or off.

10. The electric fireplace of claim 9, wherein each of the light pipes is selected from a group consisting of a translucent light pipe and a transparent light pipe.

11. The electric fireplace of claim 10, wherein a part of each light pipe penetrates through and is exposed on the simulated fuel and the imaging plate.

12. The electric fireplace of claim 11, wherein the light pipes are flexible light pipes.

* * * * *